United States Patent
Kim

(10) Patent No.: US 7,776,437 B2
(45) Date of Patent: Aug. 17, 2010

(54) DOUBLE-SIDED TAPE, DISPLAY MODULE, AND METHOD OF SEPARATING CHASSIS FROM DISPLAY PANEL

(75) Inventor: Hyuk Kim, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 342 days.

(21) Appl. No.: 11/980,364

(22) Filed: Oct. 31, 2007

(65) Prior Publication Data

US 2008/0107887 A1    May 8, 2008

(30) Foreign Application Priority Data

Nov. 2, 2006    (KR) .................... 10-2006-0107992

(51) Int. Cl.
*B32B 7/12*    (2006.01)
*H05K 5/00*    (2006.01)
*H01J 9/00*    (2006.01)

(52) U.S. Cl. ............ 428/354; 428/355 R; 428/355 AC; 361/752; 445/24

(58) Field of Classification Search .................. 428/354, 428/355 R, 355 AC; 361/752; 445/24
See application file for complete search history.

(56) References Cited

U.S. PATENT DOCUMENTS

| | | | | |
|---|---|---|---|---|
| 5,658,629 | A | * | 8/1997 | Delcuve et al. ............ 428/41.3 |
| 6,794,026 | B2 | * | 9/2004 | Ebihara et al. ........... 428/319.1 |
| 6,979,243 | B2 | | 12/2005 | Watanabe |
| 2006/0125364 | A1 | | 6/2006 | Takeda et al. |

FOREIGN PATENT DOCUMENTS

| | | |
|---|---|---|
| JP | 08-157785 A | 6/1996 |
| JP | 10-017833 A | 1/1998 |
| JP | 2004-069766 | 3/2004 |
| KR | 10-2003-0084751 A | 11/2003 |
| KR | 10-2005-0038270 A | 4/2005 |
| KR | 10-2006-0012745 A | 2/2006 |
| WO | WO 9506691 A1 * | 3/1995 |

* cited by examiner

*Primary Examiner*—Hai Vo
(74) *Attorney, Agent, or Firm*—Lee & Morse, P.C.

(57) ABSTRACT

A display module including a display panel, a chassis on a non-image-displaying surface of the display panel, and a double-sided tape between the display panel and the chassis, the double-sided tape including a foam layer, a top adhesive layer on an upper surface of the foam layer, and a first bottom adhesive layer on a lower surface of the foam layer.

19 Claims, 5 Drawing Sheets

DOUBLE-SIDED TAPE, DISPLAY MODULE, AND METHOD OF SEPARATING CHASSIS FROM DISPLAY PANEL

BACKGROUND OF THE INVENTION

1. Field of the Invention

The present embodiments relate to a double-sided tape, a display module, and a method of separating a chassis from a display panel. More particularly, the present embodiments relate to a display module in which the chassis may be easily and promptly separated from the display panel when the display module requires repair, a method of separating the chassis from the display panel, and a double-sided tape.

2. Description of the Related Art

A display module may be a flat panel display that displays images. Due to its thin and large-scale screen having a wide viewing angle and high-definition, the display module has recently received much attention as a large-scale flat panel display. The display module may include a display panel showing images, and a chassis may support the display panel. Multiple circuit boards which drive the display panel may be combined into a rear surface of the chassis, and multiple electrodes of the circuit boards and the display panel may be electrically connected by multiple signal transmitters, e.g., tape carrier packages (TCPs), flexible printed circuits (FPCs), etc.

The display module in which the display panel and the chassis are combined may be inspected to determine whether a defect has occurred in the TCPs or FCPs, which may include integrated circuits (ICs). If a defect is detected in the TCPs or FCPs during the inspection, the chassis may be separated from the display panel in order to repair the defect.

FIG. 1 illustrates a schematic view of one method of separating a chassis 2 from a display panel 1.

Referring to FIG. 1, the method may include arranging a display module such that the display panel 1 faces upward, heating the display module to a maximum of about 480° C. for about 12-15 min., with a heating lamp 5 irradiating a lower surface of the chassis 2, and lifting up the display panel 1 with a lifting apparatus 4 when the adhesive strength of a double-sided tape 3 is weakened.

The above-described method may require a large amount of time and may cause a bad odor during the heating. Also, the display panel 1 may be damaged due to the heating, or the chassis 2 may require replacement after heating.

The above information disclosed in this Background section is only for enhancement of understanding of the background of the invention, and therefore it may contain information that does not form the prior art that is already known in this country to a person of ordinary skill in the art.

SUMMARY OF THE INVENTION

Embodiments of the present invention are therefore directed to a double-sided tape, a display module, and a method of separating a chassis from a display panel which substantially overcome one or more of the problems due to the limitations and disadvantages of the related art.

It is therefore a feature of an embodiment of the present invention to provide a display module where the display panel may be readily separated from the chassis.

It is therefore another feature of an embodiment of the present invention to provide a method of separating a display panel from a chassis without damaging the display panel or causing odors.

It is therefore another feature of an embodiment of the present invention to provide a double sided tape for attaching a display panel to a chassis.

At least one of the above and other features and advantages of the present invention may be realized by providing a display module, including a display panel, a chassis on a non-image-displaying surface of the display panel, and a double-sided tape between the display panel and the chassis, the double-sided tape including a foam layer, a top adhesive layer on an upper surface of the foam layer, and a first bottom adhesive layer on a lower surface of the foam layer.

The foam layer may be a urethane foam layer.

The double-sided tape may further include a top silicone layer on the upper surface of the urethane foam layer, a bottom silicone layer on the lower surface of the urethane foam layer, a polyethylene terephthalate layer on a lower surface of the first bottom adhesive layer, and a second bottom acrylic adhesive layer on a lower surface of the polyethylene terephthalate layer, wherein the top adhesive layer is a top acrylic adhesive layer on an upper surface of the top silicone layer, and the first bottom adhesive layer is the first bottom acrylic adhesive layer on a lower surface of the bottom silicone layer.

The top acrylic adhesive layer may contact the display panel, and the second bottom acrylic adhesive layer may contact the chassis.

The double-sided tape may further include a covering polyethylene terephthalate layer on an upper surface of the top acrylic adhesive layer, and a covering acrylic adhesive layer on an upper surface of the covering polyethylene terephthalate layer.

The foam layer may be a silicone foam layer.

The double-sided tape may further include a polyethylene terephthalate layer on a lower surface of the first bottom adhesive layer, and a second bottom adhesive layer on a lower surface of the polyethylene terephthalate layer, wherein the top adhesive layer is a top acrylic adhesive layer, and the first bottom adhesive layer is a first bottom acrylic adhesive layer.

The top acrylic adhesive layer may contact the display panel, and the second bottom adhesive layer may contact the chassis.

The double-sided tape may further include a covering polyethylene terephthalate layer on an upper surface of the top acrylic adhesive layer, and a covering acrylic adhesive layer on an upper surface of the covering polyethylene terephthalate layer.

The display module may further include a heat sink sheet on a surface of the display panel facing the chassis.

The double-sided tape may be attached to regions of the display panel facing the chassis where the heat sink sheet is not attached.

The foam layer may have a net-like structure.

At least one of the above and other features and advantages of the present invention may also be realized by providing a method of separating a chassis from a display panel, including cutting a foam layer of a double-sided tape which is attached between the display panel and the chassis, in a direction substantially parallel to the display panel. The double-sided tape may include the foam layer, a top adhesive layer on an upper surface of the foam layer, and a first bottom adhesive layer on a lower surface of the foam layer.

The foam layer may be a urethane foam layer.

The double-sided tape may further include a top silicone layer on the upper surface of the urethane foam layer, a bottom silicone layer on the lower surface of the urethane foam layer, a polyethylene terephthalate layer on a lower surface of the first bottom adhesive layer, and a second bottom acrylic adhesive layer on a lower surface of the polyethylene terephthalate layer, wherein the top adhesive layer may be a top acrylic adhesive layer on an upper surface of the top silicone layer, and the first bottom adhesive layer may be a first bottom acrylic adhesive layer on a lower surface of the bottom silicone layer.

The double-sided tape may further include a covering polyethylene terephthalate layer on an upper surface of the top acrylic adhesive layer, and a covering acrylic adhesive layer on an upper surface of the covering polyethylene terephthalate layer.

The foam layer may be a silicone foam layer, and the double-sided tape may further include a polyethylene terephthalate layer on a lower surface of the first bottom adhesive layer, and a second bottom acrylic adhesive layer on a lower surface of the polyethylene terephthalate layer.

The double-sided tape may further include a covering polyethylene terephthalate layer on an upper surface of the top acrylic adhesive layer, and a covering acrylic adhesive layer on an upper surface of the covering polyethylene terephthalate layer.

The foam layer may have a net-like structure.

At least one of the above and other features and advantages of the present invention may also be realized by providing double-sided tape, including a urethane foam layer, a top silicone layer on the upper surface of the urethane foam layer, a top acrylic adhesive layer on an upper surface of the top silicone layer, a bottom silicone layer on the lower surface of the urethane foam layer, a first bottom acrylic adhesive layer on a lower surface of the bottom silicone layer, a polyethylene terephthalate layer on a lower surface of the first bottom acrylic adhesive layer, a second bottom acrylic adhesive layer on a lower surface of the polyethylene terephthalate layer, a covering polyethylene terephthalate layer on an upper surface of the top acrylic adhesive layer, and a covering acrylic adhesive layer on an upper surface of the covering polyethylene terephthalate layer.

BRIEF DESCRIPTION OF THE DRAWINGS

The above and other features and advantages of the present embodiments will become more apparent to those of ordinary skill in the art by describing in detail exemplary embodiments thereof with reference to the attached drawings, in which.

DETAILED DESCRIPTION OF THE INVENTION

Figure 1:
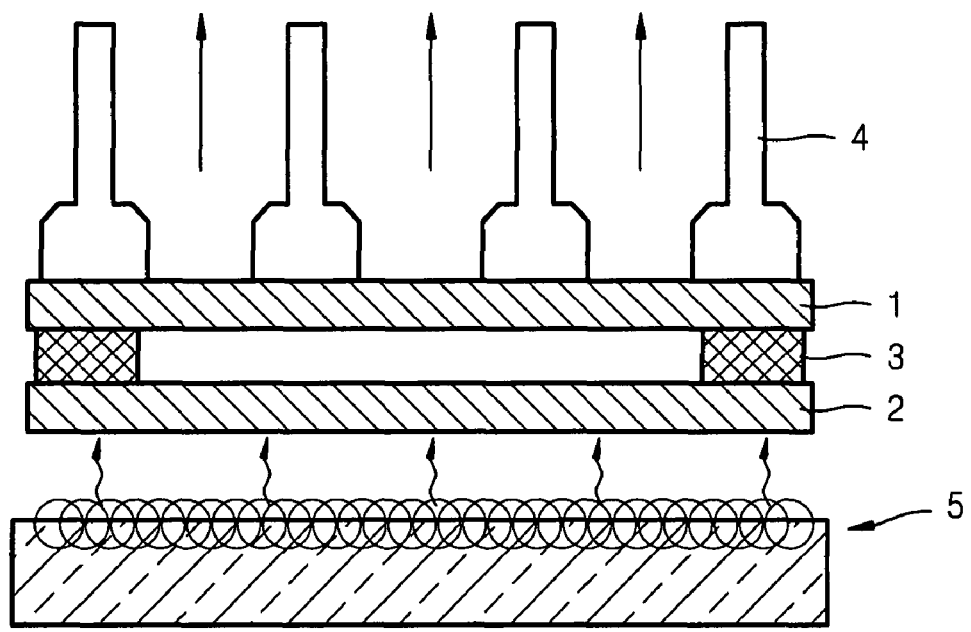
FIG. 1 illustrates a schematic view of a method of separating a chassis from a display panel.

Korean Patent Application No. 10-2006-0107992, filed on Nov. 2, 2006, in the Korean Intellectual Property Office, and entitled: "Double-Sided Tape, Plasma Display Module, and Method Of Separating Chassis From Plasma Display Panel," is incorporated by reference herein in its entirety.

The present invention will now be described more fully hereinafter with reference to the accompanying drawings, in which exemplary embodiments of the invention are illustrated. The invention may, however, be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

One method of separating a chassis from a display panel may employ an acrylic double-sided tape attached between the display panel and the chassis. To remove the acrylic tape, the display module may be heated at a high temperature for an extended time period in order to weaken the adhesive strength of the acrylic tape. Then, the display module may be lifted up. Thus, the display panel may be damaged during the heating, and the chassis may require replacement after heating.

According to the present embodiments, the display module may be separated, not by heating the display module, but by cutting a foamed material layer of double-sided tape, e.g., with a knife. Cut pieces of the tape remaining on both surfaces of the display panel and the chassis may be removed easily. As a result, a short time period may be employed for the separating operation, and an unpleasant odor from heating does not occur. Furthermore, heat-related damage of the display panel may be prevented and the chassis may be reused.

Hereinafter, embodiments will be described in detail with reference to the attached drawings.

Figure 2:
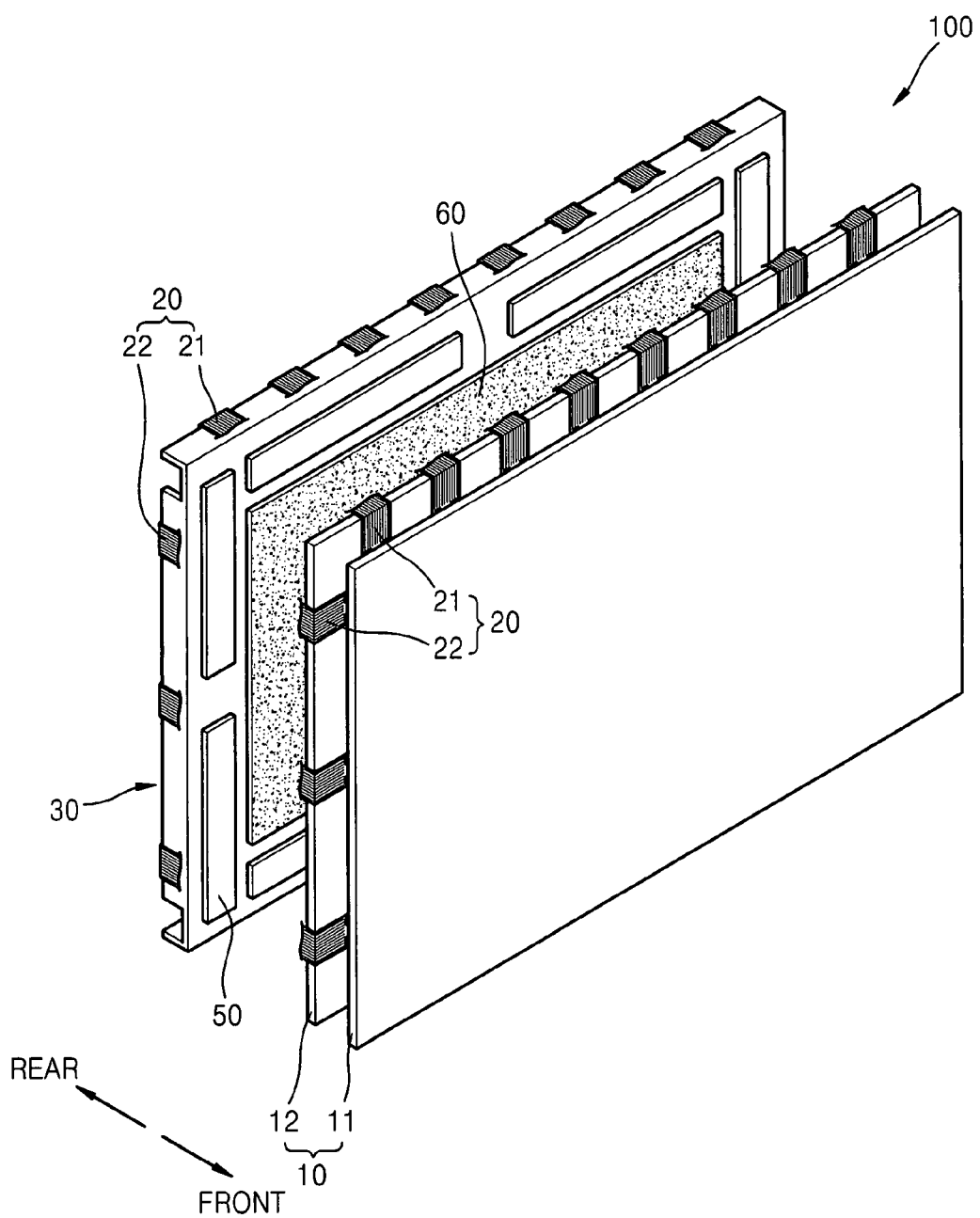
FIG. 2 illustrates an exploded perspective view of a display module according to the present embodiments.

FIG. 2 illustrates an exploded perspective view of a display module 100 according to the present embodiments. Referring to FIG. 2, the display module 100 may include a display panel 10, a chassis 30, a double-sided tape 50, a heat sink sheet 60, multiple circuit boards (not shown), and multiple signal transmitters 20. The multiple signal transmitters 20 may be classified into multiple signal transmitters 21 that may be connected through top and bottom portions of the display panel 10 and the chassis 30, and multiple signal transmitters 22 that may be connected through left and right portions of the display panel 10 and the chassis 30.

The display panel 10 may be formed by combining a front panel 11 and a rear panel 12. Although not shown in FIG. 1, when the display panel 10 is, e.g., a 3-electrode (3D) surface discharge type plasma display panel (PDP), the front panel 11 may include a front substrate, multiple pairs of sustain electrodes, a first dielectric layer, and a protection layer. Although not shown in FIG. 1, the rear panel 12 may include a rear substrate, multiple address electrodes, a second dielectric layer, a fluorescent layer, and at least one barrier rib. Alternatively, the display panel 10 may be, e.g., a 2-electrode (2D) panel, a direct current (DC) type panel, a double-substrate 2D type panel, etc. When the display panel is, e.g., a PDP, a predetermined pulse voltage may be applied to the display panel 10, and a discharge may occur from each discharge cell of the PDP, and thus ultraviolet (UV) rays may be generated.

The UV rays may excite the fluorescent layer to generate visible light so that the display panel 10 may display an image. The present embodiments are not restricted to PDPs, and the technology may be applied to other types of displays, e.g., liquid crystal displays (LCDs).

The display panel 10 may generate a large amount of heat when operating. To radiate the heat efficiently, the heat sink sheet 60 may be attached to a rear surface of the display panel 10. The heat sink sheet 60 may be a single sheet, as illustrated in FIG. 2, or a double sheet including two sheets (not shown) that may be arranged in parallel at a predetermined interval.

The double-sided tape 50 may be respectively attached to facing surfaces of the display panel 10 and the chassis 30. The display panel 10 and the chassis 30 may thus be combined. The double-sided tape 50 may be on the surfaces on which the heat sink sheet 60 is not present. When the heat sink sheet 60 is a single sheet, the double-sided tape 50 may be attached to edge sides, i.e., adjacent to the edges, of the display panel 10 and on corresponding edge sides of the chassis 30. When the heat sink sheet 60 is a double sheet, the double-sided tape 50 may be attached to surfaces of the display panel 10 and the chassis 30, which may correspond to the interval between the two separate sheets, as well as the edge sides of the display panel 10 and the corresponding edge sides of the chassis 30. In the embodiment shown in FIG. 2, eight pieces of the double sided tape 50 may be employed. However, the size and number of pieces of the double-sided tape 50 may vary.

Figure 3:
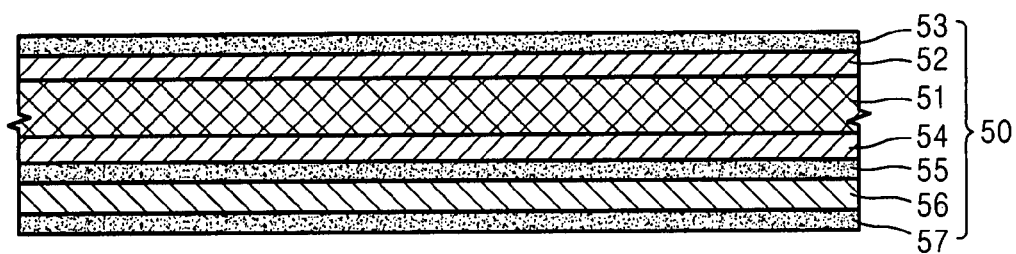
FIG. 3 illustrates a cross-sectional view of a double-sided tape according to the present embodiments.

FIG. 3 illustrates a cross-sectional view of the double-sided tape 50, where each layer of the double-sided tape 50 appears exaggerated for convenience. The thickness ratio of each layer of the drawing figure may be different from the thickness ratio of each layer of the real tape. Referring to FIG. 3, the double-sided tape 50 may include a foam layer 51. The foam layer 51 may be, e.g., a urethane foam layer 51. The urethane foam layer 51 may have a cell-like structure, e.g., a crossed structure resembling a net, as indicated by the cross-hatching in FIG. 5. A top silicone layer 52 may be on an upper surface of the urethane foam layer 51, and a bottom silicone layer 54 may be on a lower surface of the urethane foam layer 51. Since the urethane foam layer 51 may be very sensitive to high temperature and high humidity, the silicone layers 52 and 54 may be on both surfaces of the urethane foam layer 51 so as to improve reliability and durability.

One of the attributes of urethane polymers is their ability to be turned into a foam. Blowing agents, e.g., water, halocarbons, hydrocarbons, etc., may be employed. Water may react with isocyanate in the urethane prepolymer to create carbon dioxide gas, which fills and expands cells created during the mixing process. Halocarbons and hydrocarbons may be chosen such that they have boiling points at or near room temperature. Since the polymerization reaction of the urethane is exothermic, they may volatilize into a gas during the reaction process, and fill and expand the cellular polymer matrix, creating a foam. Flexible urethane foams for tapes may have an open cell, i.e., net-like, structure.

A top adhesive layer 53 may be on an upper surface of the top silicone layer 52, and a first bottom adhesive layer 55 may be on a lower surface of the bottom silicone layer 54. The top adhesive layer 53 may be, e.g., an acrylic adhesive layer. The first bottom adhesive layer 55 may be, e.g., an acrylic adhesive layer. A polyethylene terephthalate (PET) layer 56 may be on a lower surface of the first bottom adhesive layer 55, and a second bottom adhesive layer 57 may be on a lower surface of the PET layer 56. The second bottom adhesive layer 57 may be, e.g., an acrylic adhesive layer. The adhesive layers 53, 55, and 57 may provide adhesive strength. The PET layer 56 may prevent the double-sided tape 50 from becoming elongated. When the double-sided tape 50 is removed, the PET layer 56 may prevent the double-sided tape 50 from being ripped and may allow the double-sided tape 50 to be removed easily and cleanly by holding one end of the PET layer 56 and removing the double-sided tape 50 from the same end of the PET layer 56.

The above-described double-sided tape 50 may have improved reliability and durability compared to a related art acrylic double-sided tape.

Figure 4:
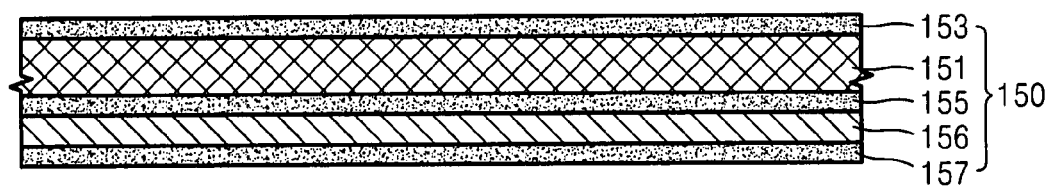
FIG. 4 illustrates a cross-sectional view of a double-sided tape according to the present embodiments.

FIG. 4 illustrates a cross-sectional view of a double-sided tape 150. A silicone foam layer 151 may be employed instead of the urethane foam layer 51 and the silicone layers 52 and 54 illustrated in FIG. 3. In this case, the durability of the silicone foam layer 151 may be less than the urethane foam layer 51, in which the silicone layers 52 and 54 are formed on both surfaces of the urethane foam layer 51.

A top adhesive layer 153 may be on an upper surface of the silicone foam layer 151, and a first bottom adhesive layer 155 may be on a lower surface of the silicone foam layer 151. The top adhesive layer 153 may be, e.g., an acrylic adhesive layer. The first bottom adhesive layer 155 may be, e.g., an acrylic adhesive layer. A PET layer 156 may be on a lower surface of the first bottom adhesive layer 155, and a second bottom adhesive layer 157 may be on a lower surface of the PET layer 156. The second bottom adhesive layer 157 may be, e.g., an acrylic adhesive layer. The adhesive layers 153, 155, and 157 may provide adhesive strength. The PET layer 156 may prevent the double-sided tape 150 from becoming elongated. When the double-sided tape 150 is removed, the PET layer 156 may prevent the double-sided tape 150 from being ripped and may allow the double-sided tape 150 to be removed easily and cleanly by holding one end of the PET layer 156 and removing the double-sided tape 150 from the same end of the PET layer 156.

Figure 5:
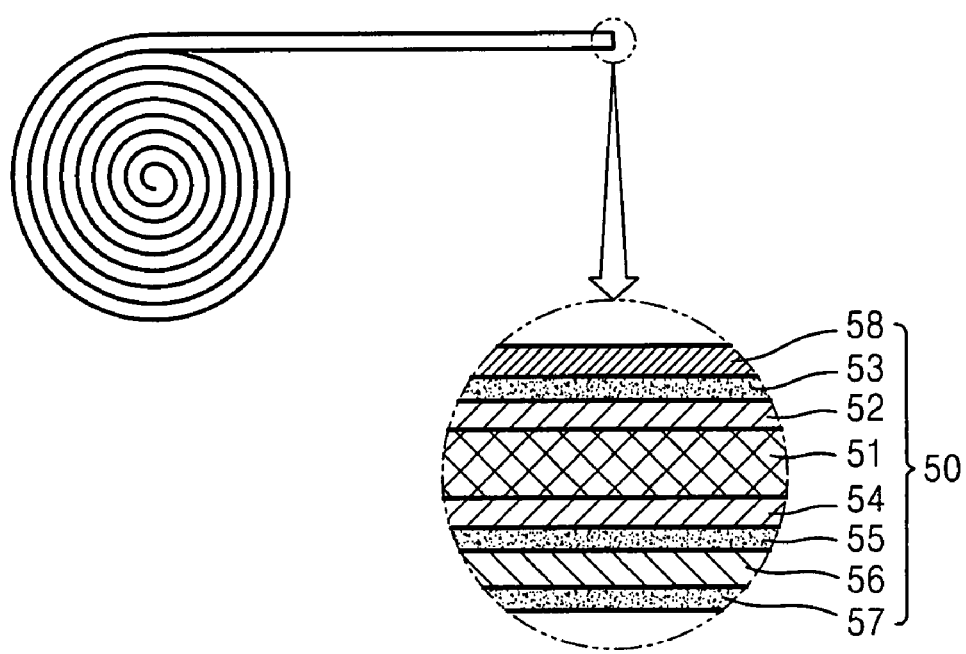
FIG. 5 illustrates a schematic view of a double-sided tape rolled according to the present embodiments.

FIG. 5 illustrates a schematic view of the rolled double-sided tape 50 according to the present embodiments. Although the double-sided tape 150 is not illustrated in FIG. 5, the double sided tape 150 may be rolled in a similar fashion as the double-sided tape 50.

Referring to FIG. 5, the double-sided tape 50 may be in a rolled form. Release paper 58 may be attached on an upper surface of the top adhesive layer 53 to prevent portions of the rolled tape 50 from adhering to each other. The release paper 58 may be coated with a release coating, e.g., silicone, acrylic polymer, etc. After the release paper 58 is removed, a surface of the double-sided tape 50 in which the PET layer 56 is formed may be attached to the chassis 30 of FIG. 2, and the other surface of the double-sided tape 50 in which the PET layer 56 is not formed may be attached to the display panel 10 of FIG. 2.

Although not illustrated in FIG. 5, the tape 150 may be similarly rolled. In this embodiment, the release paper 58 may be attached on an upper surface of the top adhesive layer 153 to prevent portions of the rolled tape 150 from adhering to each other. A surface of the double-sided tape 150 in which the PET layer 156 is formed may be attached to the chassis 30 of FIG. 2. The other surface of the double-sided tape 150 in which the PET layer 156 is not formed may be attached on the display panel 10 of FIG. 2.

Referring back to FIG. 2, the display panel 10 and the chassis 30 may be combined by the double-sided tape 50 of FIG. 3 or the double-sided tape 150 of FIG. 4. The circuit boards of the chassis 30 and multiple electrode terminals of the display panel 10 may then be electrically connected by the signal transmitters 20, e.g., tape carrier packages (TCPs), flexible printed circuits (FPCs), etc. Multiple signal transmitters 21 may be connected through top and bottom portions of the display panel 10 and the chassis 30, and multiple signal transmitters 22 may be connected through left and right portions of the display panel 10 and the chassis 30. The display module 100 may thus be completed.

The circuit boards may be attached to the rear surface of the chassis 30. Although not shown in FIG. 2, the circuit boards may include, e.g., a power supply board, a logic board, an address-electrode driving board, an X-electrode driving board, a Y-electrode driving board, etc. The address-electrode driving board, the X-electrode driving board and the Y-electrode driving board may generate pulse voltages to be applied to the address electrodes, multiple X electrodes, and multiple Y electrodes. The generated pulse voltages may be applied to each of the electrodes by the signal transmitters 20, e.g., TCPs, FPCs, etc. The signal transmitters 20 may be included in the display panel 10 by being electrically connected to the electrode terminals of the display panel 10.

When the display module 100 is completed, the display module 100 may be inspected in order to determine whether a defect has occurred. Since, in the TCPs, multiple integrated circuits ICs, e.g., address-electrode driving chips, may be included, a defect may occur. If a defect is detected in the TCPs or FCPs when the display module 100 is inspected, the chassis 30 may be separated from the display module 100 in order to repair the defect.

Hereinafter, a method of separating a display module according to the present embodiments will now be described.

The method will be described in conjunction with FIGS. 2, 3, and 4.

The urethane foam layer 51 of the double-sided tape 50 or the silicone foam layer 151 of the double-sided tape 150 may be easily separated by cutting with a sharp tool, e.g., a knife, due to the cellular structure of the urethane foam layer 51 or the silicone foam layer 151. The display panel 10 and the chassis 30 may be easily separated by cutting the double-sided tape 50 or 150 with a knife in a direction substantially parallel to the display panel 10.

Cut pieces of the double-sided tape 50 or 150 attached on the display panel 10 may be easily removed by scraping or abrading the tape 50 or 150, employing a solvent, e.g., alcohol, acetone, methyl ethyl ketone, etc. Other cut pieces of the double-sided tape 50 or 150 attached on the chassis 30 may be easily removed by holding one end of the PET layer 56 or 156 and pulling the tape 50 or 150 towards the other end of the PET layer 56 or 156.

Figure 6:
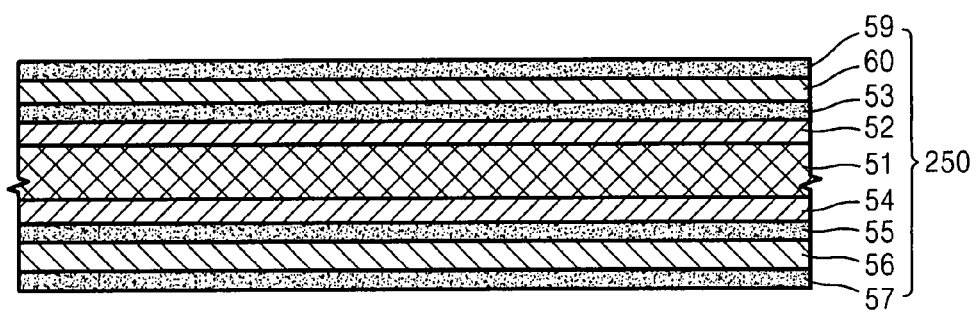
FIG. 6 illustrates a cross-sectional view of a double-sided tape according to the present embodiments.
Figure 7:
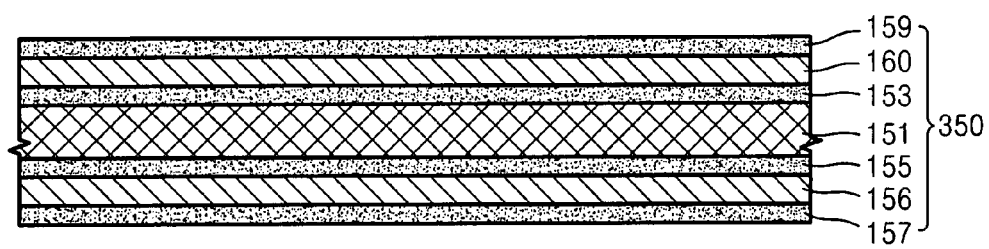
FIG. 7 illustrates a cross-sectional view of a double-sided tape according to the present embodiments.

FIGS. 6 and 7 respectively illustrate double sided tapes 250 and 350 according to the present embodiments. Referring to FIGS. 6 and 7, a PET layer 60 or 160 may be formed on an upper surface of the top adhesive layer 53 or 153, and an adhesive layer 59 or 159 may be formed on an upper surface of the PET layer 60 or 160 formed on the top adhesive layer 53 or 153. The adhesive layers 59 and 159 may be, e.g., acrylic adhesive layers. The cut pieces of the double-sided tape 250 or 350 attached to the display panel 10 may also be easily removed by holding one end of the PET layer 60 or 160 formed on the top adhesive layer 53 or 153 and pulling the tape 250 or 350 towards the other end of the PET layer 60 or 160.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A display module, comprising:
    a display panel;
    a chassis on a non-image-displaying surface of the display panel; and
    a double-sided tape between the display panel and the chassis, wherein the double-sided tape includes:
        a foam layer having an upper surface and a lower opposed surface,
        a top silicone layer on the upper surface of the foam layer,
        a top acrylic adhesive layer on an exterior surface of the top silicone layer,
        a bottom silicone layer on the lower surface of the foam layer,
        a first bottom acrylic adhesive layer on an exterior surface of the bottom silicone layer,
        a polyethylene terephthalate layer on an exterior surface of the first bottom acrylic adhesive layer; and
        a second bottom acrylic adhesive layer on an exterior surface of the polyethylene terephthalate layer.

2. The display module as claimed in claim 1, wherein the foam layer is a urethane foam layer.

3. The display module as claimed in claim 2, wherein the top acrylic adhesive layer contacts the display panel, and the second bottom acrylic adhesive layer contacts the chassis.

4. The display module as claimed in claim 2, wherein the double-sided tape further includes:
    a covering polyethylene terephthalate layer on an exterior surface of the top acrylic adhesive layer; and
    a covering acrylic adhesive layer on an exterior surface of the covering polyethylene terephthalate layer.

5. The display module as claimed in claim 1, wherein the foam layer is a silicone foam layer.

6. The display module as claimed in claim 5, wherein the top acrylic adhesive layer contacts the display panel, and the second bottom adhesive layer contacts the chassis.

7. The display module as claimed in claim 5, wherein the double-sided tape further includes:
    a covering polyethylene terephthalate layer on an exterior surface of the top acrylic adhesive layer; and
    a covering acrylic adhesive layer on an exterior surface of the covering polyethylene terephthalate layer.

8. The display module as claimed in claim 1, further comprising a heat sink sheet on a surface of the display panel facing the chassis.

9. The display module as claimed in claim 8, wherein the double-sided tape is attached to regions of the display panel facing the chassis where the heat sink sheet is not attached.

10. The display module as claimed in claim 1, wherein the foam layer has a net-like structure.

11. A method of separating a chassis from a display panel, comprising:
    cutting a foam layer of a double-sided tape which is attached between the display panel and the chassis, in a direction substantially parallel to the display panel, wherein the double-sided tape includes:
        a foam layer having an upper surface and a lower opposed surface,
        a top silicone layer on the upper surface of the foam layer,
        a top acrylic adhesive layer on an exterior surface of the top silicone layer, a bottom silicone layer on the lower surface of the foam layer, a first bottom acrylic adhesive layer on an exterior surface of the bottom silicone layer, a polyethylene terephthalate layer on an exterior surface of the first bottom acrylic adhesive layer; and a second bottom acrylic adhesive layer on an exterior surface of the polyethylene terephthalate layer.

12. The method as claimed in claim 11, wherein the foam layer is a urethane foam layer.

13. The method as claimed in claim 12, wherein the double-sided tape further includes:

a covering polyethylene terephthalate layer on an exterior surface of the top acrylic adhesive layer; and a covering acrylic adhesive layer on an exterior surface of the covering polyethylene terephthalate layer.

14. The method as claimed in claim 11, wherein the foam layer is a silicone foam layer.

15. The method as claimed in claim 14, wherein the double-sided tape further includes:

a covering polyethylene terephthalate layer on an exterior surface of the top acrylic adhesive layer; and a covering acrylic adhesive layer on an exterior surface of the covering polyethylene terephthalate layer.

16. The method as claimed in claim 11, wherein the foam layer has a net-like structure.

17. A double-sided tape, comprising:

a foam layer having an upper surface and a lower opposed surface;

a top silicone layer on the upper surface of the foam layer;

a top acrylic adhesive layer on an exterior surface of the top silicone layer;

a bottom silicone layer on the lower surface of the foam layer;

a first bottom acrylic adhesive layer on an exterior surface of the bottom silicone layer;

a polyethylene terephthalate layer on an exterior surface of the first bottom acrylic adhesive layer; and a second bottom acrylic adhesive layer on an exterior surface of the polyethylene terephthalate layer.

18. The double-sided tape as claimed in claim 17, wherein the foam layer is a urethane foam layer.

19. The double-sided tape as claimed in claim 17, wherein the double-sided tape further includes:

a covering polyethylene terephthalate layer on an exterior surface of the top acrylic adhesive layer; and a covering acrylic adhesive layer on an exterior surface of the covering polyethylene terephthalate layer.

* * * * *